(12) United States Patent
Fix et al.

(10) Patent No.: US 7,414,513 B2
(45) Date of Patent: Aug. 19, 2008

(54) ORGANIC COMPONENT FOR OVERVOLTAGE PROTECTION AND ASSOCIATED CIRCUIT

(75) Inventors: Walter Fix, Nuremberg (DE); Dietmar Zipperer, Erlangen (DE)

(73) Assignee: PolyIC GmbH & Co. KG, Furth (DE)

( * ) Notice: Subject to any disclaimer, the term of this patent is extended or adjusted under 35 U.S.C. 154(b) by 348 days.

(21) Appl. No.: 10/524,646

(22) PCT Filed: Aug. 4, 2003

(86) PCT No.: PCT/DE03/02612

§ 371 (c)(1),
(2), (4) Date: Sep. 2, 2005

(87) PCT Pub. No.: WO2004/021256

PCT Pub. Date: Mar. 11, 2004

(65) Prior Publication Data

US 2006/0098362 A1 May 11, 2006

(30) Foreign Application Priority Data

Aug. 23, 2002 (DE) ................................ 102 38 800

(51) Int. Cl.
*H01H 85/06* (2006.01)
*H01H 85/048* (2006.01)

(52) U.S. Cl. .................... 337/167; 337/296; 337/297

(58) Field of Classification Search ................. 337/167, 337/296, 297
See application file for complete search history.

(56) References Cited

U.S. PATENT DOCUMENTS

| | | | |
|---|---|---|---|
| 3,512,052 A | 12/1970 | MacIver et al. | |
| 3,668,483 A * | 6/1972 | Kellenbenz | 361/100 |
| 3,769,096 A | 10/1973 | Ashkin | |
| 3,939,363 A * | 2/1976 | Engel | 361/111 |
| 3,955,098 A | 5/1976 | Kawamoto | |
| 4,302,648 A | 11/1981 | Sado et al. | |
| 4,340,657 A | 7/1982 | Rowe | |
| 4,442,019 A | 4/1984 | Marks | |
| 4,573,099 A * | 2/1986 | Ganesan et al. | 361/56 |
| 4,598,331 A * | 7/1986 | Legatti | 361/46 |
| 4,797,773 A * | 1/1989 | Honorof et al. | 361/58 |

(Continued)

FOREIGN PATENT DOCUMENTS

DE 10033112 1/2002

(Continued)

OTHER PUBLICATIONS

Garnier F et al:, "Vertical Devices Architecture By Molding Of Organic-Based Thin Film Transistor", Applied Physics Letters, American Institute Of Physics, XP000784120, issn: 0003-6951 abbildung 2.

(Continued)

*Primary Examiner*—Anatoly Vortman
(74) *Attorney, Agent, or Firm*—Carella, Byrne, Bain, et al; Elliot Olstein, Esq.; William Squire

(57) ABSTRACT

The invention concerns a component of predominantly organic material which affords overvoltage protection for electronic circuits, and a circuit by which a multiple of the threshold voltage of an individual component can be implemented.

4 Claims, 2 Drawing Sheets

U.S. PATENT DOCUMENTS

| | | | |
|---|---|---|---|
| 4,865,197 A | 9/1989 | Craig | |
| 4,910,389 A * | 3/1990 | Sherman et al. | 219/548 |
| 4,926,052 A | 5/1990 | Hatayama | |
| 4,937,119 A | 6/1990 | Nickles et al. | |
| 4,977,357 A * | 12/1990 | Shrier | 338/21 |
| 5,068,634 A * | 11/1991 | Shrier | 338/21 |
| 5,099,380 A | 3/1992 | Childers et al. | 361/56 |
| 5,142,263 A * | 8/1992 | Childers et al. | 338/21 |
| 5,173,835 A | 12/1992 | Cornett et al. | |
| 5,206,525 A | 4/1993 | Yamamoto et al. | |
| 5,259,926 A | 11/1993 | Kuwabara et al. | |
| 5,260,848 A * | 11/1993 | Childers | 361/127 |
| 5,321,240 A | 6/1994 | Takahira | |
| 5,347,144 A | 9/1994 | Garnier et al. | |
| 5,347,185 A * | 9/1994 | Tailliet | 327/326 |
| 5,364,735 A | 11/1994 | Akamatsu et al. | |
| 5,395,504 A | 3/1995 | Saurer et al. | |
| 5,480,839 A | 1/1996 | Ezawa et al. | |
| 5,486,851 A | 1/1996 | Gehner et al. | |
| 5,502,396 A | 3/1996 | Desarzens | |
| 5,546,889 A | 8/1996 | Wakita et al. | |
| 5,569,879 A | 10/1996 | Gloton et al. | |
| 5,574,291 A | 11/1996 | Dodabalapur et al. | |
| 5,578,513 A | 11/1996 | Maegawa | |
| 5,580,794 A | 12/1996 | Allen | |
| 5,625,199 A | 4/1997 | Baumbach et al. | |
| 5,629,530 A | 5/1997 | Brown et al. | |
| 5,630,986 A | 5/1997 | Charlton et al. | |
| 5,652,645 A | 7/1997 | Jain | |
| 5,654,863 A * | 8/1997 | Davies | 361/111 |
| 5,691,089 A | 11/1997 | Smayling | |
| 5,705,826 A | 1/1998 | Aratani et al. | |
| 5,729,428 A | 3/1998 | Sakata et al. | |
| 5,780,995 A * | 7/1998 | Maggioni et al. | 322/8 |
| 5,854,139 A | 12/1998 | Aratani et al. | |
| 5,869,972 A | 2/1999 | Birch et al. | |
| 5,883,397 A | 3/1999 | Isoda et al. | |
| 5,892,244 A | 4/1999 | Tanaka et al. | |
| 5,946,551 A | 8/1999 | Dimitrakopoulos | |
| 5,967,048 A | 10/1999 | Fromson et al. | |
| 5,970,318 A | 10/1999 | Choi et al. | |
| 5,973,598 A | 10/1999 | Beigel | |
| 5,997,817 A | 12/1999 | Crismore et al. | |
| 5,998,805 A | 12/1999 | Shi et al. | |
| 6,036,919 A | 3/2000 | Thym et al. | |
| 6,045,977 A | 4/2000 | Chandross et al. | |
| 6,060,338 A | 5/2000 | Tanaka et al. | |
| 6,072,716 A | 6/2000 | Jacobsen et al. | |
| 6,083,104 A | 7/2000 | Choi | |
| 6,087,196 A | 7/2000 | Sturm et al. | |
| 6,133,835 A | 10/2000 | De Leeuw et al. | |
| 6,150,668 A | 11/2000 | Bao et al. | |
| 6,197,663 B1 | 3/2001 | Chandross et al. | |
| 6,207,472 B1 | 3/2001 | Calligari et al. | |
| 6,215,130 B1 | 4/2001 | Dodabalapur | |
| 6,221,553 B1 | 4/2001 | Wolk et al. | |
| 6,229,180 B1 * | 5/2001 | Yoshida et al. | 257/355 |
| 6,251,513 B1 | 6/2001 | Rector et al. | |
| 6,284,562 B1 | 9/2001 | Batlogg et al. | |
| 6,300,141 B1 | 10/2001 | Segal et al. | |
| 6,321,571 B1 | 11/2001 | Themont et al. | |
| 6,322,736 B1 | 11/2001 | Bao et al. | |
| 6,329,226 B1 | 12/2001 | Jones et al. | |
| 6,330,464 B1 | 12/2001 | Colvin et al. | |
| 6,335,539 B1 | 1/2002 | Dimitrakopoulos et al. | |
| 6,340,822 B1 | 1/2002 | Brown et al. | |
| 6,344,662 B1 | 2/2002 | Dimitrakopoulos et al. | |
| 6,362,509 B1 | 3/2002 | Hart | |
| 6,384,804 B1 | 5/2002 | Dodabalapur et al. | |
| 6,403,396 B1 | 6/2002 | Gudesen et al. | |
| 6,429,450 B1 | 8/2002 | Mutsaers et al. | |
| 6,498,114 B1 | 12/2002 | Amundson et al. | |
| 6,517,995 B1 | 2/2003 | Jacobson et al. | |
| 6,555,840 B1 | 4/2003 | Hudson et al. | |
| 6,593,690 B1 | 7/2003 | McCormick et al. | |
| 6,603,139 B1 | 8/2003 | Tessler et al. | |
| 6,621,098 B1 | 9/2003 | Jackson et al. | |
| 6,852,583 B2 | 2/2005 | Bernds et al. | |
| 6,903,958 B2 | 6/2005 | Bernds et al. | |
| 2002/0018911 A1 | 2/2002 | Bemius et al. | |
| 2002/0022284 A1 | 2/2002 | Heeger et al. | |
| 2002/0025391 A1 | 2/2002 | Angelopoulos | |
| 2002/0053320 A1 | 5/2002 | Duthaler | |
| 2002/0056839 A1 | 5/2002 | Joo et al. | |
| 2002/0068392 A1 | 6/2002 | Lee et al. | |
| 2002/0130042 A1 | 9/2002 | Moerman et al. | |
| 2002/0170897 A1 | 11/2002 | Hall | |
| 2002/0195644 A1 | 12/2002 | Dodabalapur et al. | |
| 2003/0059987 A1 | 3/2003 | Sirringhaus et al. | |
| 2003/0112576 A1 | 6/2003 | Brewer et al. | |
| 2003/0175427 A1 | 9/2003 | Loo et al. | |
| 2004/0002176 A1 | 1/2004 | Xu | |
| 2004/0013982 A1 | 1/2004 | Jacobson et al. | |
| 2004/0026689 A1 | 2/2004 | Bernds et al. | |
| 2004/0084670 A1 | 5/2004 | Tripsas et al. | |
| 2004/0211329 A1 | 10/2004 | Funahata et al. | |

FOREIGN PATENT DOCUMENTS

| | | |
|---|---|---|
| EP | 0 108650 | 5/1984 |
| EP | 0 268 370 A2 | 5/1988 |
| EP | 0 268 370 A3 | 5/1988 |
| EP | 0 350 179 | 1/1990 |
| EP | 0 418504 | 3/1991 |
| EP | 0460242 | 12/1991 |
| EP | 0 501 456 A2 | 9/1992 |
| EP | 0 501 456 A3 | 9/1992 |
| EP | 0 511807 | 11/1992 |
| EP | 0685985 | 12/1995 |
| EP | 0716458 | 6/1996 |
| EP | 0 786820 | 7/1997 |
| EP | 0 966 182 | 12/1999 |
| EP | 0962984 | 12/1999 |
| EP | 0 981 165 | 2/2000 |
| EP | 0 989 614 A2 | 3/2000 |
| EP | 1 065 725 A2 | 1/2001 |
| EP | 1 065 725 A3 | 1/2001 |
| EP | 1 102 335 A2 | 5/2001 |
| EP | 1 104 035 A2 | 5/2001 |
| EP | 1 237 207 | 9/2002 |
| GB | 723598 | 2/1955 |
| GB | 2 058 462 | 4/1981 |
| JP | 61001060 | 1/1986 |
| JP | 61167854 | 7/1986 |
| JP | 362065477 A | 3/1987 |
| JP | 01169942 | 7/1989 |
| JP | 05152560 | 6/1993 |
| JP | 05259434 | 10/1993 |
| JP | 05347422 | 12/1993 |
| JP | 08197788 | 8/1996 |
| JP | 2969184 B | 11/1999 |
| JP | 2001085272 | 3/2001 |
| WO | WO 93 16491 | 8/1993 |
| WO | WO 94/17556 | 8/1994 |
| WO | WO 95/06240 | 3/1995 |
| WO | WO 95 31831 | 11/1995 |
| WO | WO 96 02924 | 2/1996 |
| WO | WO 97/12349 | 4/1997 |
| WO | WO 97/18944 | 5/1997 |
| WO | WO 98 18186 | 4/1998 |
| WO | WO 98/40930 | 9/1998 |
| WO | WO 99/07189 | 2/1999 |
| WO | WO 99/10929 | 3/1999 |
| WO | WO 99 10939 | 3/1999 |

| | | |
|---|---|---|
| WO | WO 99 21233 | 4/1999 |
| WO | WO 99 30432 | 6/1999 |
| WO | WO 99 39373 | 8/1999 |
| WO | WO 99 40631 | 8/1999 |
| WO | WO 99 54936 | 10/1999 |
| WO | WO 99/66540 | 12/1999 |
| WO | WO 00/33063 | 6/2000 |
| WO | WO 00/36666 | 6/2000 |
| WO | WO 01/03126 | 1/2001 |
| WO | WO 01/06442 | 1/2001 |
| WO | WO 01/08241 | 2/2001 |
| WO | WO 01 15233 | 3/2001 |
| WO | WO 01/17029 | 3/2001 |
| WO | WO 01 17041 | 3/2001 |
| WO | WO 01/27998 | 4/2001 |
| WO | WO 01/47044 A2 | 6/2001 |
| WO | WO 01/47044 A3 | 6/2001 |
| WO | WO 01 47045 | 6/2001 |
| WO | WO 01/73109 A2 | 10/2001 |
| WO | WO 01/73109 A3 | 10/2001 |
| WO | WO 02/05360 | 1/2002 |
| WO | WO 02/05361 | 1/2002 |
| WO | WO 02 19443 | 3/2002 |
| WO | WO 02/29912 | 4/2002 |
| WO | WO 02/43071 | 5/2002 |
| WO | WO 02/47183 | 6/2002 |
| WO | WO 02/065557 | 8/2002 |
| WO | WO 02/071139 | 9/2002 |
| WO | WO 02/071505 | 9/2002 |
| WO | WO 02/091495 | 11/2002 |
| WO | WO 02/095805 A2 | 11/2002 |
| WO | WO 02/095805 A3 | 11/2002 |
| WO | WO 02/099907 | 12/2002 |
| WO | WO 03/067680 | 8/2003 |
| WO | WO 03/069552 | 8/2003 |
| WO | WO 2004/042837 A2 | 5/2004 |
| WO | WO 00 79617 | 12/2004 |

OTHER PUBLICATIONS

Collet J. et al:, Low Voltage, 30 NM Channel Length, Organic Transistors with a Self-Assembled Monolayer as Gate Insulating Films:, Applied Physics Letters, American Institute of Physics. New York, US, Bd 76, Nr. 14, Apr. 3, 2000, Seiten 1941-1943, XP000950589, ISSN:0003-6951, das ganze Dokument.

Hwang J D et al:, "A Vertical Submicron Slc thin film transistor", Solid State Electronics, Elsevier Science Publishers, Barking, GB, Bd. 38, NR. 2, Feb. 1, 1995, Seiten 275-278, XP004014040, ISSN:0038-1101, Abbildung 2.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

"Short-Channel Field-Effect Transistor", IBM Technical Disclosure Bulletin, IBM Corp., New York, US, Bd. 32, Nr. 3A, Aug. 1, 1989, Seiten 77-78, XP000049357, ISSN:0018-8689, das ganze Dokument.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Miyamoto, Shoichi et al:, Effect of LDD Structure and Channel Poly-Si Thinning on a Gate-All-Around TFT(GAT) for SRAM's, IEEE Transactions on Electron Devices. vol. 46, No. 8, Aug. 1999.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Chen, Shiao-Shien et al:, "Deep Submicrometer Double-Gate Fully-Depleted SOI PMOS Devices: A Concise Short-Channel Effect Threshold Voltage Model Using a Quasi-2D Approadh", IEEE Transaction on Electron Devices, vol. 43, No. 9, Sep. 1996.

Forrest et al.: "The Dawn of Organic Electronics", IEEE Spectrum, Aug. 2000, Seiten 29-34, XP002189000, IEEE Inc., New York, US ISSN:0018-9235, Seite 33, rechte Spalte, Zelle 58-Seite 34, linke Spalte, Zeile 24; Abbildung 5.

Patent Abstracts of Japan, vol. 009, No. 274 (E-354), Oct. 31, 1985 & JP 60 117769 A (Fujitsu KK), Jun. 25, 1985 (Jun. 25, 1985) Zusammenfassung.

Zie Voor Titel Boek, de 2e Pagina, XP-002189001, PG 196-228.

Drury et al., "Low-Cost All-Polymer Integrated Circuits", American Institute of Physics, Applied Physics Letters, 1998, vol. 73, No. 1, pp. 108-110, Jul. 6, 1998.

Garnier, F. et al, "All-Polymer Field-Effect Transistor Realized by Printing Techniques", Science, American Association for the Advancement of Science US, vol. 265, Sep. 16, 1994, pp. 1684-1686.

Assadi A, et al:, Field-Effect Mobility of Poly (3-Hexylthiophene) Dept. of Physics and Measurement Technology, Received Mar. 3, 1988; accepted for Publication May 17, 1988.

Bao, Z. et al., "High-Performance Plastic Transistors Fabricatecd by Printing Techniques", Chem. Mater vol. 9, No. 6, 1997, pp. 1299-1301.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Angelopoulos M et al, "In-Situ Radiation Induced Doping", Mol. Cryst. Liq. Cryst. 1990, vol. 189, pp. 221-225.

Dai, L. et al, Photochemical Generation of Conducting Pattersn in Polybutadiene Films:, Macromolecules, vol. 29, No. 1, 1996, pp. 282-287, XP 001042019, the whole document.

Roman et al., Polymer Diodes with High Rectification:, Applied Physics Letters, vol. 75, No. 21, Nov. 22, 1999.

Patent Abstracts of Japan, vol. 010, No. 137, May 21, 1986 (JP 361001060A).

Schoebel, "Frequency Conversion with Organic-On-Inorganic Heterostructured Diodes", Extended Abstracts of the International Conference on Solid State Devices and Materials, Sep. 1, 1997.

Braun D., et al, "Visible light emission from semiconducting polymer diodes", American Institute of Physics, Applied Physics Letters 58, May 6, 1991, pp. 1982-1984.

Yu, G. et al., "Dual-function semiconducting polymer devices: Light-emmiting and photodetecting diodes", American Institute of Physics, Applied Physics Letter 64, Mar. 21, 1994, pp. 1540-1542.

Lucent Technologies, "Innovation marks significant milestone in the development of electronic paper", Cambridge, MA and Murray Hill, NJ, Nov. 20, 2000. XP-002209726.

Clemens, W. et al., "Vom Organischen Transistor Zum Plastik-Chip," Physik Journal, V. 2, 2003, pp. 31-36.

Garnier et al., "Conjugated Polymers and Oligomers as Active Material For Electronic Devices", Synthetic Metals, vol. 28, 1989.

Gelinck, G.H. et al., "High-Performance All-Polymer Integrated Circuits", Applied Physics Letters, v. 77, 2000, pp. 1487-1489.

Zheng, Xiang-Yang et al., "Electrochemical Patterning of the Surface of Insulators with Electronically Conductive Polymers", J. Electrochem. Soc., v. 142, 1995, pp. L226-L227.

Lidzey, D. G. et al., "Photoprocessed and Micropatterned Conjugated Polymer LEDs", Synthetic Metals, V. 82, 1996, pp. 141-148.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Rost, Henning et al., "All-Polymer Organic Field Effect Transistors", Proc. Mat. Week, CD, 2001, pp. 1-6.

Manuelli, Alessandro et al., "Applicability of Coating Techniques for the Production of Organic Field Effect Transitors", IEEE Polytronic 2002 Conference, 2002, pp. 201-204.

Ullman, A. et al., "High Performance Organic Field-Effect Transistors and Integrated Inverters", Mat. Res. Soc. Symp. Proc., v. 665, 2001, pp. 265-270.

Fix, W. et al., "Fast Polymer Integrated Circuits based on a Polyfluorene Derivative", ESSDERC 2002, 2002, pp. 527-529.

Knobloch, A. et al., "Printed Polymer Transistors", Proc. Polytronic, v. 84, 2001, pp. 84-89.

Ficker, J. et al., "Dynamic and Lifetime Measurements of Polymer OFETS and Integrated Plastic Circuits," Proc. of SPIE, v. 466, 2001, pp. 95-102.

Crone, B. et al, "Large-scale complementary Integrated circuits based on Organic transistors", Nature, vol. 403, Feb. 3, 2000, pp. 521.

Fix, W., et al., "Fast polymer integrated circuits", American Institute of Physics, Applied Physics Letters, vol. 81, No. 89, Aug. 2002, pp. 1735-1737.

Dodabalapur, A. et al., Organic smart pixels, American Institute of Physics, Applied Physics Letters, vol. 73, No. 2, Jul. 13, 1998, pp. 142-144.

Halls, J.J. M., et al., "Efficient photodiodes from interpenetrating polymer networks", Nature, vol. 376, Aug. 10, 1995, pp. 498-500.

Brown, A.R. et al., "Field-effect transistors made from solution-processed organic semiconductors", Elsevier Science, S.A., Synthetic Metals 88 (1997) pp. 37-55.

Brown, A.R., "Logic Gates Made from Polymer Transistors and Their Use in Ring Oscillators", Science, vol. 270, Nov. 10, 1995, pp. 972-974.

Klauk, H. et al., "Penacene Thin Film Transistor and Inverter Circuits", 1997 International Exectron Devices Meeting Technical Digest, pp. 539-542, Dec. 1997.

Klauk, H. et al., "Fast Organic Thin Film Transistors Circuits", IEEE Electron Device Letters, vol. 20, No. 6, pp. 289-291.

Bao, Z. et al., "Organic and Polymeric Materials for the Fabrications of Thin Film Field-Effect Transistors", paper presented at the meeting of American Chemical Society, Division of Polymer Chemistry, XX, XX, Bd. 39, Nr. 1, Mar. 29, 1998, P001032497, ISSN: 0032-3934 das ganze Dokument.

Oelkrug, D. et al., "Electronic spectra of self-organized oligothiophene films with 'standing' and 'lying' molecular units", Elsevier Science S.A., 1996, Thin Solid Films 284-270.

Sandberg, H. et al, "Ultra-thin Organic Films for Field Effect Transistors", SPIE vol. 4466, 2001, pp. 35-43.

Chen, X.L. et al., "Morphological and Transistor Studies of Organic Molecular Semiconductors with Anisotropic Electrical Characteristics", American Chemical Society, 2001, Chem. Mater. 2001, 13, 1341-1348.

De Leeuw D.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.

Lowe, J. et al., "Poly (3—(2—Acetoxyethyl)Thiophene): A Model Polymer for Acid-Catalyzed Lithography", Synthetic Metals, Elsevier Sequoia, Lausanne, CH, Bd. 85, 1997, Seiten 1427-1430.

U.S. Appl. No. 10/562,989, filed Jun. 29, 2006, Jurgen Ficker et al.
U.S. Appl. No. 10/52,869, filed Oct. 5, 2006, Walter Fix et al.
U.S. Appl. No. 10/569,763, Walter Fix et al.
U.S. Appl. No. 10/568,730, filed Feb. 8, 2007, Wolfgang Clemens et al.
U.S. Appl. No. 10/569,233, filed Jan. 25, 2007, Adolf Bernds et al.
U.S. Appl. No. 10/570,571, filed Jan. 11, 2017, Wolfgang Clemens et al.
U.S. Appl. No. 10/585,775, Walter Fix.
U.S. Appl. No. 11/574,139, Jurgen Ficker.
U.S. Appl. No. 10/524,646, Walter Fix et al.
U.S. Appl. No. 10/533,756, Wolfgang Clemens et al.
U.S. Appl. No. 10/534,678, Wolfgang Clemens et al.
U.S. Appl. No. 10/535,448, W. Clemens et al.
U.S. Appl. No. 10/535,449, Walter Fix et al.
U.S. Appl. No. 10/541,815, Axel Gerlt et al.
U.S. Appl. No. 10/541,956, Wolfgang Clemens et al.
U.S. Appl. No. 10/541,957, Walter Fix et al.
U.S. Appl. No. 10/543,561, Wolfgang Clemens et al.
U.S. Appl. No. 10/542,678, Adolf Bernds et al.
U.S. Appl. No. 10/542,679, Adolf Bernds et al.

Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.

Brabec, C.J. et al., "Photovoltaic properties of a conjugated polymer/methanofullerene composites embedded in a polystyrene matrix", Journal of Applied Physics, vol. 85, No. 9, 1999, pp. 6866-6872.

Gosain, D.P., "Excimer laser crystallized poly-Si TFT's on plastic substrates", Second International Symposium on Laser Precision Microfabrication, May 16-18, 2001, Singapore, vol. 4426, pp. 394-400.

Lu, Wen et al., "Use of Ionic Liquids for $\pi$-Conjugated Polymer Electrochemical Devices", Science, vol. 297, 2002, pp. 983-987.

Shaheen, S.E., et al., "Low band-gap polymeric photovoltaic devices", Synthetic Metals, vol. 121, 2001, pp. 1583-1584.

Wang, Yading et al., "Electronically Conductive Semiinterpentrating Polymer Networks of Poly(3-octylthiophene)", Macromolecules 1992, vol. 25, pp. 3284-3290.

Yu, G. et al., "Dual-function semiconducting polymer devices: Light-emitting and photodetecting diodes", American Institute of Physics, Applied Physics Letter 64, Mar. 21, 1994, pp. 1540-1542.

* cited by examiner

— 1 component
— 2 components in series
— 3 components in series

ORGANIC COMPONENT FOR OVERVOLTAGE PROTECTION AND ASSOCIATED CIRCUIT

The invention concerns a component of predominantly organic material, which affords overvoltage protection for electronic circuits.

Electronic components for overvoltage protection are known, based on inorganic circuits which are founded on conventional silicon semiconductor technology. Zener diodes and tunnel diodes may be mentioned here by way of example.

Organic electronic components and circuits based thereon are being developed in regard to lowest-cost applications such as RFID-tags (radio frequency identification), tickets, wearable electronics (electronic circuits which are incorporated into textile fabrics) and so forth. They are inexpensive and can be produced over a large surface area by simple printing processes. Those circuits need a constant voltage supply, in which case damage due to voltage peaks, for example if the circuit comes too close to the transmitting antenna or if the RFID-tag is moved too quickly through an alternating electromagnetic field, must be avoided. Hitherto no electronic component is yet known which—comparable to an organic field effect transistor—includes predominantly organic material.

Therefore the object of the present invention is to provide an electronic component which includes predominantly organic material and which affords overvoltage protection, that is to say when the voltage falls below or exceeds an adjustable threshold voltage the component acts as a resistor which interrupts the flow of current and vice-versa, wherein the electrical capacitance of the component is low.

The subject of the invention is an electronic component for overvoltage protection, comprising predominantly organic functional polymers, which component has at least the following layers:

a substrate, a primary electrode, an organic semiconducting functional layer, and a secondary electrode, wherein the threshold voltage can be adjusted by the selection of the electrode materials and/or of the material for the semiconducting layer. In addition the subject of the invention is a circuit, including at least two components which comprise predominantly organic materials, connected in series for overvoltage protection, wherein the series circuit affords a threshold voltage which corresponds to a multiple of the threshold voltage of the individual components.

In accordance with an embodiment the component includes at least one intermediate layer between one of the electrodes and the organic semiconductor layer. The intermediate layer can be for example predominantly of organic and/or oxidic material. The threshold voltage can be adjusted within some volts by the inclusion of the at least one intermediate layer, The component is operated in the forward direction, that is to say, up to the threshold voltage no current (or only a negligibly low current) flows, whereas a very high current flows below the threshold voltage so that the voltage of a power-limited current source breaks down. In the reverse direction no current (or only a negligibly low current) flows.

In accordance with an embodiment at least two components are connected in series. In that way it is possible to achieve a desired threshold voltage which corresponds to the multiple of the threshold voltage of the individual components.

The simple structure of the component of conducting and semiconducting layers permits integration into organic circuits. The conducting and/or semiconducting layers can in that case be produced by one process and/or by common process steps, for example printing processes.

The invention is described in greater detail hereinafter by means of embodiments.

FIG. 1 shows the simple structure of the component according to the invention without intermediate layers, FIG. 2 shows an embodiment with two intermediate layers, FIG. 3 shows two components connected in series, FIG. 4 shows the corresponding current-voltage curves relating to FIG. 3, and FIG. 5 finally shows a component involving a lateral structure;

FIG. 1 shows the substrate 1, for example comprising a flexible film such as a polyester film, and disposed thereon (implementation of a vertical structure), the primary electrode 2 which for example is of organic material such as Pani, Pedot or metals or alloys such as gold, copper, aluminum or titanium, disposed thereon the semiconducting layer 3 which is on an organic base of for example polythiophene and/or polyfluorene, and thereon the secondary electrode 4 whose material is again for example Pani, Pedot or a metal or an alloy such as gold, copper, aluminum or titanium. In contrast to conventional components that component has a high threshold voltage which can be adjusted by the selection of the electrode materials and the semiconductor material.

FIG. 2 shows a component involving a layer structure comparable to FIG. 1 in respect of the layers 2 through 4 and the substrate 1, but in this case disposed between the primary electrode 2 and the semiconducting layer 3 and between the semiconducting layer 3 and the second electrode 4 is a respective intermediate layer (5, 6) by which the threshold voltage can be displaced. The intermediate layers 5, 6 can be of the most widely varying materials, such as for example organic material such as polythiophene, polyfluorene (both materials doped or undoped), Pani, Pedot or an oxidic material such as metal oxide or silicon oxide.

Figure 1:
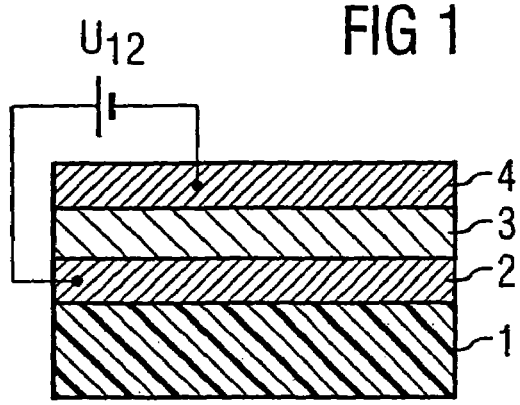
Figure 2:
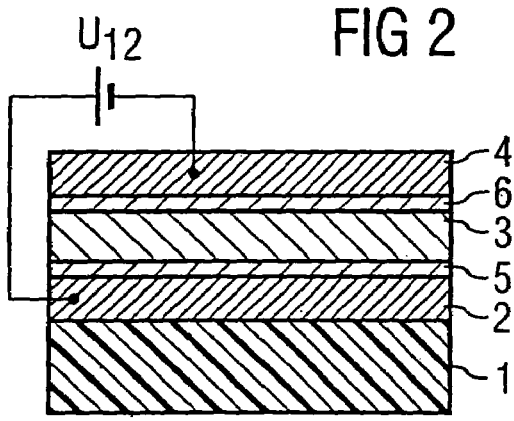
Figure 3:
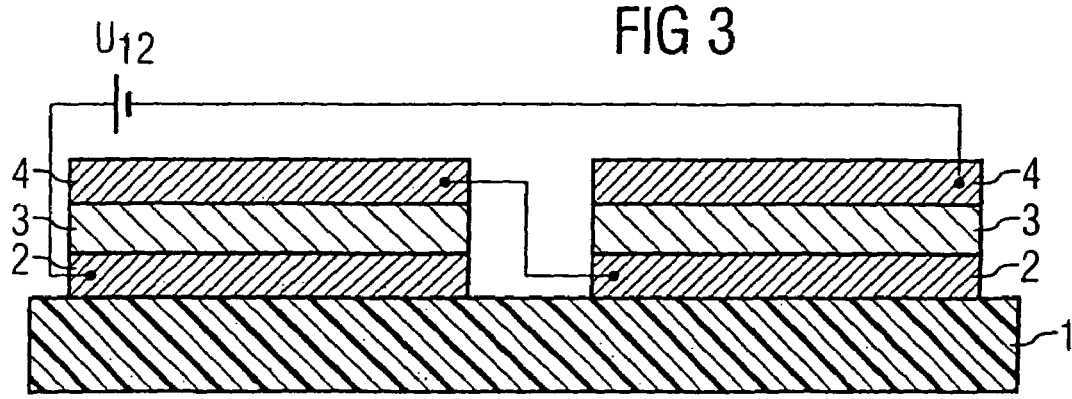
FIG. 3 shows two components connected in series, wherein the layer structure in this embodiment is the same as that of the individual component of FIG. 1.
Figure 4:
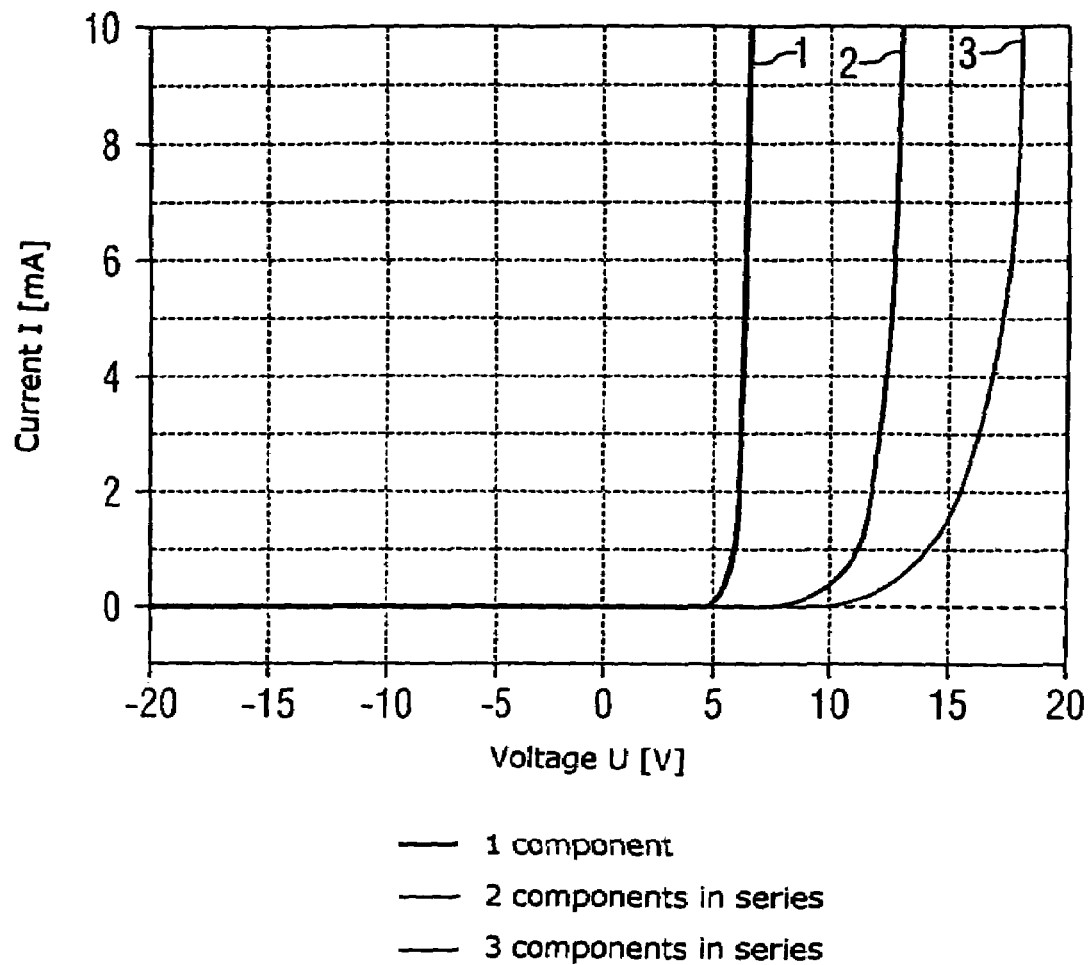
FIG. 4 shows the current-voltage characteristics of series-connected components. It can be seen in that case how the series connection of a plurality of components (FIG. 3) also makes it possible to achieve a threshold voltage corresponding to the multiple of the threshold voltage of an individual component.
Figure 5:
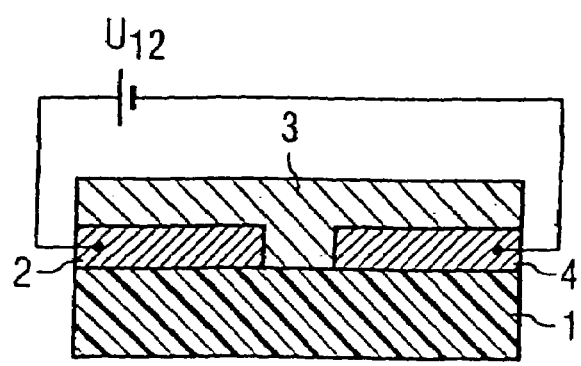

Finally FIG. 5 shows the lateral structure of a component as is basically known from FIG. 1. It is once again possible to see here a substrate 1, a primary electrode 2, a semiconducting layer 3 and a secondary electrode 4.

The threshold voltage can be very well adjusted by the selection of suitable electrodes and/or semiconductor materials. Equally the threshold voltage can be displaced by one or two additional intermediate layers of different semiconductor materials such as for example thin insulating layers or oxides. The series connection of a plurality of components also permits rough adaptation to the respective demands involved.

The capacitance of the component is dependent on the layer thickness and the material-specific dielectric constant of the organic semiconductor. The capacitance can be kept low by means of layers of suitable thickness.

The component is manufactured by means of known processes. The individual layers are applied by sputtering and/or vapor deposition or however when dealing with soluble materials such as for example polymers by spin coating and/or other coating processes and/or printing processes. Structuring can be effected on the one hand by conventional processes such as etching and lift-off in conjunction with lithography or on the other hand by printing procedures.

In specific terms the component, for example as shown in FIG. 1, can be produced as follows: a metal layer 2 (for example gold) is sputtered on a flexible polyester film 1 and the metal layer is structured by means of lithography and etching. Then a semiconducting polymer (for example polythiophene) which is put in solution is applied by spin coating. After evaporation of the solvent the result obtained is a homogeneous semiconductor layer 3. A secondary electrode 4 (for example aluminum) is sputtered thereonto—structured by a shadow mask—.

The term 'organic', 'organic material' or 'functional polymer' or 'polymer' includes here all kinds of organic, metallorganic and/or organic-inorganic plastic materials (hybrids), in particular those which are identified in English for example by 'plastics'. This involves all kinds of substances with the exception of the semiconductors which form the conventional diodes (germanium, silicon) and the typical metallic conductors. Restriction in a dogmatic sense to organic material as carbon-bearing material is accordingly not intended, but rather the broad use of for example silicones is also envisaged. In addition the term is not to be subjected to any restriction in regard to the molecule size, in particular to polymeric and/or oligomeric materials, but the use of small molecules is certainly also possible. The word component 'polymer' in the expression functional polymer is historically governed and in that respect does not make any statement about the presence of an actually polymeric bond.

This invention for the first time provides an organic component which functions as overvoltage protection and which can be integrated into organic circuits.

The invention claimed is:

1. An electronic component for overvoltage protection, comprising:
   predominantly organic functional polymers, which component has at least the following layers:
   a substrate layer;
   a primary electrode layer lying in a first plane;
   an organic semiconducting functional layer; and
   a secondary electrode layer lying in a second plane spaced from the first plane, the semiconductor layer being coupled only to two electrodes to provide the given threshold set forth below;
   wherein the device exhibits a given threshold voltage value manifested by the material compositions of the electrode and semiconductor layers.

2. The component as set forth in claim 1 which has at least one intermediate layer between one of the electrodes and the organic semiconductor layer.

3. A circuit, including at least two components as set forth in claim 1 connected in series for overvoltage protection, wherein the series circuit affords a threshold voltage which corresponds to a multiple of the threshold voltage of the individual components.

4. A circuit, including at least two components as set forth in claim 2 connected in series for overvoltage protection, wherein the series circuit affords a threshold voltage which corresponds to a multiple of the threshold voltage of the individual components.

* * * * *